March 24, 1964

R. F. NICKERSON 3,126,312

WEFTLESS PAPER TAPE

Filed May 12, 1960

INVENTOR
RALPH F. NICKERSON

3,126,312
WEFTLESS PAPER TAPE
Ralph F. Nickerson, West Springfield, Mass., assignor to Shawinigan Resins Corporation, Springfield, Mass., a corporation of Massachusetts
Filed May 12, 1960, Ser. No. 28,783
6 Claims. (Cl. 161—144)

This invention pertains to flat weftless tapes comprising twisted paper strands bonded in side by side parallel relationship with an adhesive. More particularly, this invention pertains to such tapes bonded with particular synthetic resin binders and to the methods of preparation of the tapes.

Synthetic resin adhesives have been used to bond various fibers in the form of weftless tapes. The tapes have been prepared from the natural fibers including cotton and linen, from regenerated cellulose such as viscose rayon, as well as from such other materials as glass, asbestos and synthetic linear polymers. The synthetic resin adhesives used to bond these fibers have been applied both from solution and dispersion form, in which an organic liquid solvent or water is used as the vehicle for the adhesive. The known synthetic resin adhesives employed in these applications include both aqueous solutions of polyvinyl alcohol and aqueous dispersions of polyvinyl acetate. Although such known synthetic resin adhesives have been found to yield improved tapes over those prepared from the animal or vegetable glues used previously, certain problems still exist in the preparation of weftless tapes from certain fibers, especially twisted paper strands.

It has not been found possible heretofore to prepare weftless tapes from twisted paper strands which possess flexibility combined with the necessary transverse strength. By transverse strength is meant the ability to resist a stress applied perpendicular to the lengthwise direction of the twisted paper strands joined in side by side parallel relationship. When such a tape was prepared from the known synthetic resin adhesives having the necessary transverse strength so that no splitting apart of the individual strands would occur upon the application of even small tensile forces, the resultant tape lacked flexibility both in the longitudinal and transverse directions of the twisted paper strands. In addition to lack of flexibility in these tapes, it was necessary to employ such quantities of the synthetic resin adhesive to obtain the necessary transverse strength that the tape generally curled and twisted in the transverse or weft-wise direction. It would therefore be highly desirable to employ an adhesive imparting both the necessary strength and flexibility to a weftless paper tape so as to provide a substitute for the many cotton and other fiber tapes now used widely.

The applicant has discovered that by use of a particular synthetic resin adhesive applied in a prescribed manner that weftless paper tapes can be prepared having both strength and such flexibility that the resultant tape is a soft and twist-free structure. In addition the finished tape has better moisture resistance, abrasion resistance and freedom from tack than other known similar paper tapes. The present tapes also possess a glossy attractive appearance, will adhere well to glass and other difficult to adhere to surfaces and have the excellent printability characteristics of most textile tapes.

The weftless tapes of the present invention are prepared by juxtaposing in side by side parallel relationship a plurality of twisted paper strands, applying a coating to one side of the juxtaposed strands by suitable means, which coating comprises an aqueous dispersion of a polyvinyl acetal, and thereafter removing the water by any of the well known means.

The preferred method for preparation of the weftless paper tape can be shown by reference to the attached drawings, wherein.

Figures 1, 2:
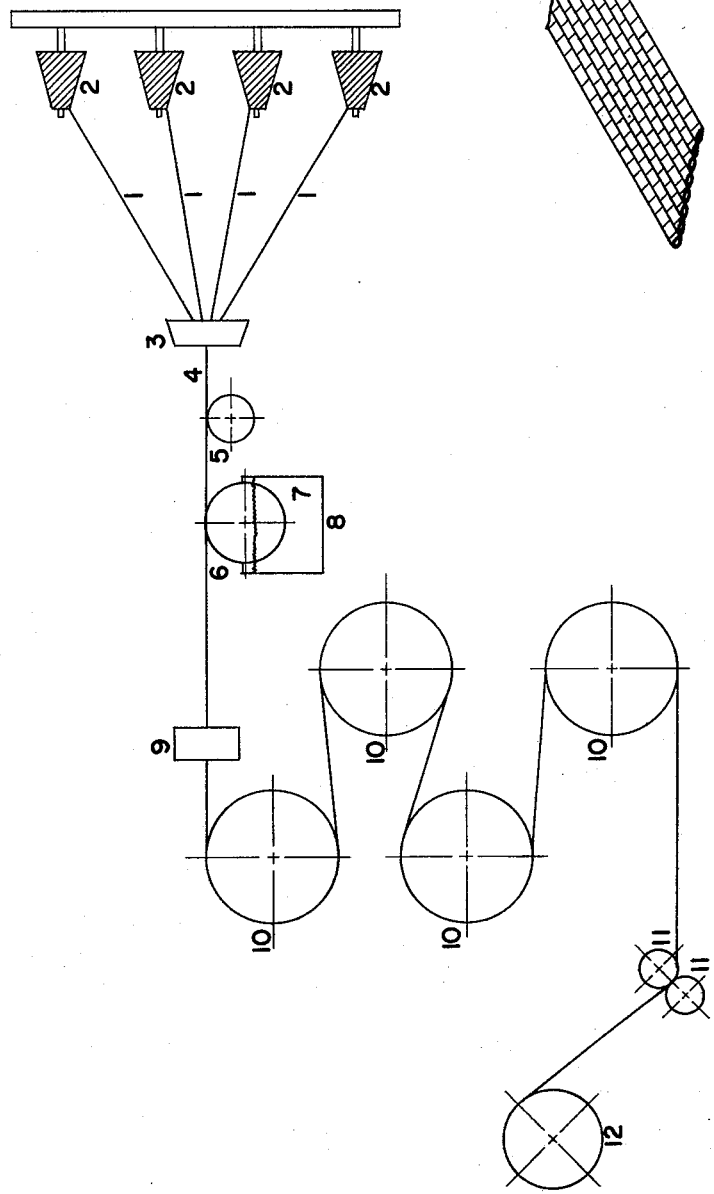
FIGURE 1 is a diagrammatic view of a section of weftless tape formed by the preferred method of the invention.
FIGURE 2 is a schematic elevational view of a well known slasher type apparatus by means of which the present method may be carried out.
Figure 3:
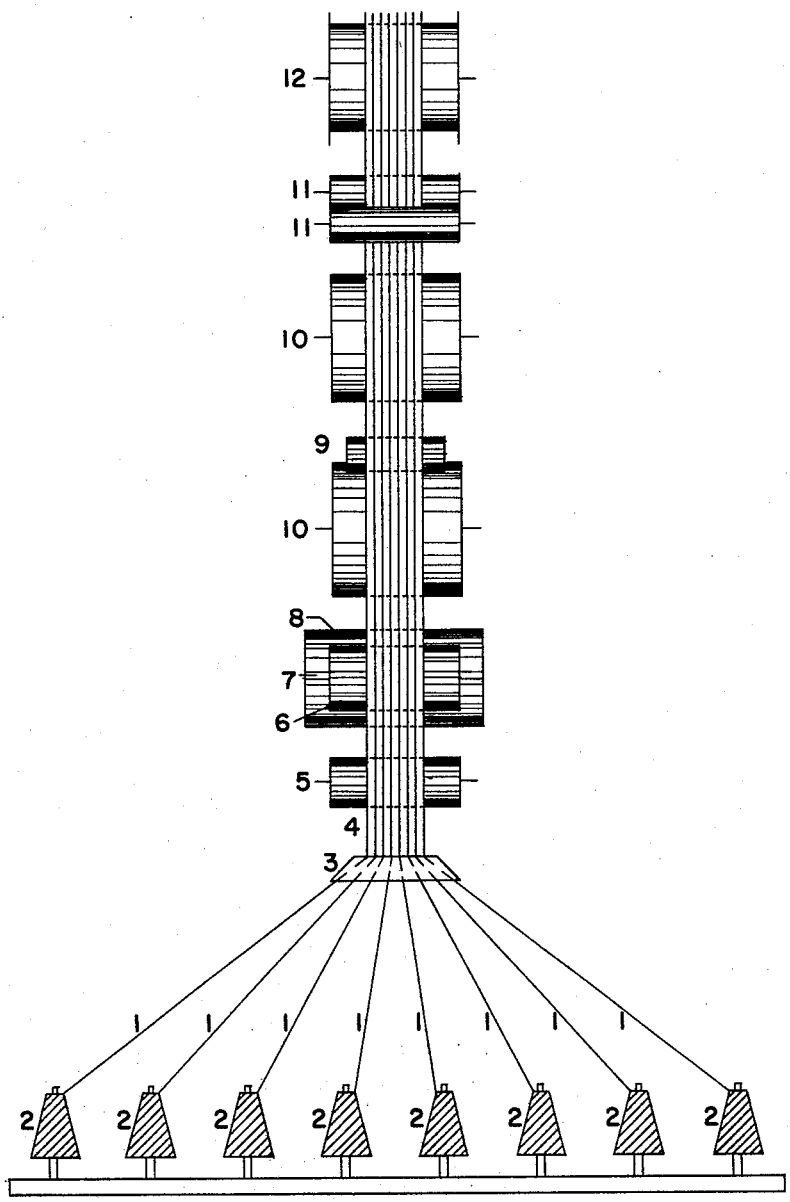
FIGURE 3 is a plan view of the apparatus shown in FIGURE 2.

Referring to FIGURES 2–3, the individual twisted paper strands 1 from which the weftless tape shown in FIGURE 1 is prepared are fed continuously into the starting end of the apparatus from a plurality of bobbins 2 or rolls mounted adjacent to the apparatus. The multiple strands are next fed into a comb type device 3 by means of which the individual strands are brought together in juxtaposed side by side parallel relationship. The comb type positioning element mentioned is well known and made of an extremely hard material so as to minimize wear and abrasion during use. The multiple parallel positioned strands 4 are then led over an adjustment roll 5 to the adhesive containing tank which may or may not be heated depending on the adhesive composition and results desired. Said adjustment roll provides means for varying the contact of the multiple strands with the transfer roll 6 used to apply the adhesive to the strands, thereby governing the amount of adhesive applied. The parallel positioned strands being led from the adjustment roll next contact the adhesive transfer roll whereupon adhesive 7 from the tank 8 being fed by said roller is applied to the strands. Out of the adhesive bath the coated parallel strands are next fed through a guiding element 9 whose function is to bring in parallel contact the individual strands making up the tape and to keep the tape in a flat twist-free position. The preferred guiding element comprises two or more parallel spaced concavely shaped rods through which the coated tape is passed. This form of guide arrangement is well known and described in Karass, Canadian Patent 544,703. The formed tape is then fed over heated drums 10 around the periphery of one drum and on another such heated drum for the purpose of drying the adhesive. The drying drum temperatures are maintained at temperatures between 50–100° C. to remove the water in the adhesive composition, whereupon coalescence of the resin particles takes place and the adhesive bond is formed. The dried tape is then passed through finishing or tension rolls 11 to the wind-up spool 12 the tension rolls providing the function of drawing the strands and tape through the various operations of the process as well as providing change of direction where desirable.

The invention may be practiced in its preferred embodiment as shown in the following examples and subsequent discussions thereon, but is not limited thereto. Where parts and percentages appear in the specification and the claims, they are parts and percentages by weight unless otherwise designated.

*Example 1*

Seventeen dry paper yarns were fed from spools into the above described apparatus as a flat band and coated with an adhesive having the following composition:

|  | Parts |
|---|---|
| Polyvinyl butyral | 100 |
| Plasticizer (butyl ricinoleate) | 40 |
| Oleic acid | 6 |
| Potassium hydroxide | 1 |
| Water | 147 |
|  | 294 |

The preparation of the aqueous dispersion adhesive used above is well known such as those prepared according to the methods taught in U.S. Patents 2,455,402, 2,532,223 and 2,611,755. The adhesive coating on the tape was heat-cured by passing the coated tape over four drying drums of the said above apparatus, the drums being maintained at approximately 50° C. The finished tape, approximately 11/16 inch wide, and consisting of the seventeen parallel paper strands, was soft and pliable and could be bent through 180° in a direction perpendicular to the longitudinal direction of the twisted paper strands without any splitting of the strands away from each other. This bending could be repeated many times without any separation of the strands.

*Example 2*

A weftless tape was prepared according to the method described in Example 1 except that for the aqueous dispersion adhesive used therein there was substituted an adhesive having the following composition:

|  | Parts |
|---|---|
| Polyvinyl butyral | 100 |
| Plasticizer (tri-(2-ethylhexyl)phosphate) | 35 |
| Oleic acid | 6 |
| Sodium hydroxide | 0.7 |
| Water | 142 |
|  | 283.7 |

The flexibility and strength characteristics of the heat-cured tape were comparable to those obtained for the tapes of Example 1.

To illustrate that the unexpected results obtained for the particular adhesive compositions of the present invention cannot be obtained with other plasticized polyvinyl resin adhesives, Examples 3–5 are shown for comparison purposes. The adhesive of Example 3 comprises an aqueous externally plasticized polyvinyl alcohol solution of lower solids than the present composition. The reason for the lower solids in the polyvinyl alcohol adhesive is to minimize the adverse effects which relatively high viscosity has upon the coating method of the present invention, since aqueous solutions of polyvinyl alcohol have comparatively much higher viscosities than the present dispersions. The adhesive of Example 4 comprises an aqueous internally plasticized polyvinyl acetate emulsion having approximately the same solids ratio as the present compositions. The internal plasticization is achieved by the well known means of polymerizing the vinyl acetate monomer in the presence of such other monomers copolymerizable therewith that the resulting copolymer possesses the same order of flexibility as externally plasticized homopolymers of vinyl acetate. The adhesive of Example 5 is an aqueous externally plasticized polyvinyl acetate homopolymer emulsion having approximately the same solids ratio as the present compositions.

*Example 3*

A weftless tape was prepared according to the method described in Example 1 except that for the aqueous dispersion adhesive used therein, an aqueous polyvinyl alcohol solution was substituted having the following composition:

|  | Parts |
|---|---|
| Polyvinyl alcohol (99–100% hydrolysis, 55–65 centipoises viscosity for a 4% aqueous solution at 20° C.) | 10 |
| Plasticizer (glycerol) | 20 |
| Water | 70 |
|  | 100 |

As compared with the weftless paper tape of Example 1, essentially no bonding of the individual paper strands was obtained with the above heat cured adhesive. This result is believed due to excessive loss of the adhesive into the interior of paper strands. This was surprising in view of the relatively much greater viscosity of this adhesive which could be expected to prevent migration of this known paper adhesive into the interior of said paper strands.

*Example 4*

A weftless tape was prepared according to the method described in Example 1 except that for the aqueous dispersion adhesive used therein, there was substituted an aqueous adhesive having the following composition:

|  | Parts |
|---|---|
| A commercial aqueous emulsion of the copolymer comprising 75% vinyl acetate with 25% dibutyl maleate (55% total solids) | 100 |

As compared with the weftless paper tape of Example 1, the individual strands in the above tape were pulled apart in a single 180° flexure.

*Example 5*

A weftless tape was prepared according to the method described in Example 1 except that for the aqueous dispersion adhesive used therein, there was substituted an externally plasticized polyvinyl acetate homopolymer emulsion having the following composition:

|  | Parts |
|---|---|
| A 55% total solids polyvinyl acetate emulsion (made according to the method described in U.S.P. 2,508,342) | 94.5 |
| Plasticizer (dibutyl phthalate) | 5.5 |
|  | 100 |

The above tape was also found to pull apart in a single 180° flexure. Additionally, in contrast to the tack-free characteristics of the tape of Example 1 under ordinary conditions, the individual wraps of the above heat-cured tape were found to cohere badly on the wind-up spool of the slasher.

*Example 6*

To illustrate still further other variations of the present invention, including the incorporation in the adhesive composition of optional beneficial additives, an adhesive was prepared by diluting to 25% solids at room temperature, the aqueous dispersion of Example 1 with a 1% aqueous solution of hydroxyethyl cellulose having a 4000 centipoise viscosity for a 2% aqueous solution at 20° C. A weftless tape was prepared according to the method of Example 1 utilizing the modified adhesive and results comparable to those described in said example were obtained.

The particular aqueous plasticized polyvinyl acetal dispersion adhesives of the present invention comprise 20–75% polyvinyl acetal by weight of the dispersion and 35–50% plasticizer by weight of the polyvinyl acetal. The preparation of the aqueous plasticized polyvinyl acetal dispersion is well known, such as shown in the patent references listed in Example 1. Although these specific mentioned references teach the incorporation of the plasticizer during the prepartion of the dispersion itself, it is also known to prepare stable polyvinyl acetal dispersions without plasticizers, to which a suitable plasticizer may thereafter be added. The amount of plasticizer in the present aqueous polyvinyl acetal dispersions is deemed critical for the practice of the invention. Below the minimum plasticized content of 35% by weight of the polyvinyl acetal, the heat-cured tape loses its soft pliable twist-free structure and does not possess adequate flexibility to permit the individual twisted paper strands of the tape to withstand pulling apart upon at 180° flexure. Above a maximum plasticizer content of 50% by weight of the polyvinyl acetal, the heat-cured tape loses transverse strength and becomes tacky. The optimum quantity of any suitable plasticizer is readily determinable from the quantity of the particular polyvinyl acetal employed in the dispersion and from the particular results desired. Especially improved tapes have been prepared from the polyvinyl butyral dispersions shown in the above examples with 40% butyl ricinoleate plasticizer based on the weight of polyvinyl butyral.

In order to obtain weftless paper tape having both flexibility and transverse strength according to the practice of the present invention, it is necessary to control the amount of the polyvinyl acetal adhesive applied to form the tape. Suitable tapes have been prepared containing from 5-20% polyvinyl acetal based on the weight of the paper twine. Below 5% polyvinyl acetal on the paper twine solids, the bond strength of the adhesive will not permit 180° flexure of the finished tape without yielding. Above 20% polyvinyl acetal on the paper twine solids, although the bond strength is further increased over lesser ratios of polyvinyl acetal to paper twine, the finished tape becomes too stiff and developes a tendency to curl. The optimum ratio of polyvinyl acetal to paper twine can readily be determined without undue experimentation and will be influenced by the size of the paper yarns, the degree of absorption of paper, the paper roughness, the adhesive demands and finally the desired ultimate properties. For weftless paper tapes comprising a plurality of individual paper yarns having a diameter up to approximately 1/16 inch, the preferred ratio of polyvinyl acetal has been found to be 7-8% of the weight of the paper yarn.

The drying temperatures to be employed in order to remove the water from the present aqueous dispersions and thereby form the adhesive bond is not critical. In the absence of water, coalescence of the individual discrete resin particles in the dispersion will take place at ordinary temperatures and the adhesive bond produced thereby will be equivalent to one obtained at more elevated temperatures. In the preferred method of preparing the weftless tapes of the invention, drying temperatures in the range 50–100° C. are satisfactory. The maximum permissible drying temperature is dictated by such considerations as flow of the thermoplastic adhesive bond, loss of plasticizer or even degradation of the paper.

Suitable polyvinyl acetals for the practice of the invention are obtained by reacting polyvinyl alcohol or a partially hydrolyzed polyvinyl ester with an aldehyde, especially butyraldehyde. Polyvinyl acetals contain a certain number of hydroxyl groups and may contain a certain number of ester groups depending upon the extent of the hydrolysis and the acetalization reactions. These groups are often referred to as "residual ester groups" or "residual polyvinyl ester" and "residual hydroxyl groups," "residual polyvinyl alcohol" or, to indicate origin, "residual unacetalized polyvinyl alcohol." Useful polyvinyl acetal resins can contain on a weight basis, 1–35% ester groups calculated as polyvinyl ester, 3–25% hydroxyl groups calculated as polyvinyl alcohol and the balance substantially acetal groups. The preferred resins contain on a weight basis less than 3% ester groups, 16–22% hydroxyl groups calculated as polyvinyl alcohol and the balance substantially butyraldehyde acetal. In the commercial preparation of the preferred polyvinyl butyrals, the ester groups are acetate groups. Other polyvinyl acetals such as the reaction products of hydrolyzed polyvinyl esters with formaldehyde, acetaldehyde, propionaldehyde, and benzaldehyde, also may be used in the practice of this invention.

As substitutes for the soap-type emulsifying agent used in the aqueous polyvinyl acetal dispersion shown in the above examples, there may be employed any of the well known cationic, anionic and non-ionic surfactants which are compatible with polyvinyl acetal dispersions. Preferred surfactants of the cationic type are for example, tertiary amines and especially the ethylene oxide condensation products of the primary fatty amines. Of the anionics, the following are preferred: sulfosuccinates, for example, the dioctyl ester of sodium sulfosuccinic acid; alkyl aryl sulfonates, for example, sodium salt of condensed sulfonic acid. Preferred non-ionic surfactants are the ethylene oxide fatty acid condensates, for example, polyoxyethylene sorbitan monolaurate; alkyl aryl polyether alcohols, for example, isooctyl phenyl polyethoxy ethanol; and polypropylene glycol ethylene oxide condensates such as those taught in U.S.P. 2,674,619 and 2,677,700.

Suitable plasticizers may be selected from the class of water immiscible organic plasticizer materials which are compatible with polyvinyl acetal dispersions. Useful plasticizers include such organic compounds as the phthalate esters, phosphate esters, chlorinated biphenyls, and citrate esters. Dibutyl phthalate is the preferred plasticizer primarly because of its relatively lower viscosity compared to other suitable plasticizers which lower viscosity aids both in the incorporation of the plasticizer into the aqueous polyvinyl acetal dispersion and the ease of application of the final adhesive to the paper tape.

A particularly desirable form of the invention resides in the aqueous plasticized polyvinyl acetal adhesive containing a thickening agent. It is possible by use of a thickeneing agent to reduce the polyvinyl acetal content in the adhesive and still produce tapes having properties comparable to tapes prepared from the higher polyvinyl acetal content adhesives. This results in a lower cost to the user of the adhesive thereby effecting a more widespread use of the invention. Suitable thickener containing adhesives for the practice of the invention comprise aqueous dispersions containing 20–40% polyvinyl acetal by weight of the dispersion, 35–50% plasticizer by weight of the polyvinyl acetal and 1–5% thickener by weight of the dispersion. Useful thickeners or stabilizers, as they are sometimes called can best be defined by their function in the liquid dispersion. The primary function of the thickener in the dispersion is to increase the viscosity of the water phase in the dispersion. This function is distinct from the primary function usually sought for thickeners in liquid polymer dispersions where the primary function generally sought is to stabilize the dispersion by preventing the collision of resin particles with the subsequent result of precipitation. The applicant's liquid dispersions would not so precipitate without the presence of the thickener. The thickening effect was desired solely for the application of the liquid composition. By this it is meant that the applicant desires a composition of such viscosity so as to be able to transfer the adhesive from a roll to the individual twisted paper strands comprising the tape, the adhesive further having sufficient viscosity so as not to subsequently impregnate said twisted paper strands to such a degree that insufficient adhesive will remain on the surface for bonding the strands. Useful thickeners can be selected from the class of hydrophilic colloids which are compatible with aqueous polyvinyl acetal dispersions. Effective thickeners include the cellulosics such as the sodium salt of carboxymethyl cellulose, methyl cellulose and hydroxyethyl cellulose; borated alginate; and the natural gums, for example guar gum, methylated guar gum and gum arabic.

It is not intended to limit the optional additives for the adhesives to the thickeners described above. For example, pigments, extenders therefor or dyes can be added to the adhesive and such further modified adhesives be used as effectively in the practice of the invention. It is obvious therefore that many such modifications can be made in the adhesive composition without departing from the spirit or the scope of the invention.

What is claimed is:

1. A pliable, twist-free, non-tacky, weftless tape capable of withstanding repeated 180° longitudinal flexures without separation of its component strands, said tape consisting of twisted paper strands bonded together in parallel position with 5 to 20% by weight, based on the total paper weight, of an adhesive residue yielded by the in situ drying of an aqueous dispersion comprising 20 to 75% by weight of a polyvinyl acetal characterized by a residual polyvinyl ester content of 1 to 35% by weight and a residual polyvinyl alcohol content of 3 to 25% by weight, and 35 to 50% of plasticizer, based on the polyvinyl acetal weight content of the dispersion.

2. The tape of claim 1 wherein the polyvinyl acetal resin of the adhesive is a polyvinyl butyral containing less than 3% by weight of residual polyvinyl ester, calculated as polyvinyl acetate, and from 16 to 22% of residual unacetalized polyvinyl alcohol.

3. The tape of claim 1 wherein the polyvinyl acetal dispersion yielding the adhesive residue comprises 20 to 40% by weight of the polyvinyl acetal, 1 to 5% by weight of an hydrophilic thickener and 35 to 50%, based on the acetal resin weight of a plasticizer.

4. The tape of claim 3 wherein the thickener is selected from the class consisting of sodium carboxymethyl cellulose, methyl cellulose, hydroxyethyl cellulose, borated alginates, guar gum, methylated guar gum and gum arabic.

5. The tape of claim 2 wherein the individual paper strands have a diameter of about $\frac{1}{16}$ inch and where the dry adhesive residue binding the strands is present at the level of about 8% of the total weight of the paper strands.

6. A process for preparing the weftless tape of claim 1 comprising the juxtaposition in longitudinal parallel position of a plurality of twisted paper strands, the application of a coating to one side of the juxtaposed strands by contact with a roller having thereon the polyvinyl acetal dispersion, and the subsequent drying of the coated juxtaposed strands by contact with a drum heated to a temperature of at least 50° C.

References Cited in the file of this patent

UNITED STATES PATENTS

| | | |
|---|---|---|
| 2,296,942 | Nutt et al. | Sept. 29, 1942 |
| 2,455,402 | Bromley | Dec. 7, 1948 |
| 2,532,223 | Bromley | Nov. 28, 1950 |
| 2,611,755 | Bromley | Sept. 23, 1952 |
| 2,707,367 | Pullman | May 3, 1955 |
| 2,764,568 | Hawkins | Sept. 25, 1956 |
| 2,778,763 | Novak | Jan. 22, 1957 |
| 3,028,281 | Karass | Apr. 3, 1962 |